(12) United States Patent
Ettori

(10) Patent No.: US 7,143,665 B2
(45) Date of Patent: Dec. 5, 2006

(54) MECHANICAL-HYDRAULIC CONTROL DEVICE FOR CONTROLLING THE LOCKING AND UNLOCKING MOVEMENTS OF ROTARY DISK IN A ROTARY DISC TABLE WORKPIECE PROCESSING APPARATUS

(76) Inventor: Ignazio Ettori, Via San Lorenzo, 39, 25069 Villa Carcina (Brescia) (IT)

( * ) Notice: Subject to any disclaimer, the term of this patent is extended or adjusted under 35 U.S.C. 154(b) by 71 days.

(21) Appl. No.: 10/264,294

(22) Filed: Oct. 3, 2002

(65) Prior Publication Data

US 2003/0066175 A1   Apr. 10, 2003

(30) Foreign Application Priority Data

Oct. 5, 2001   (IT)   .......................... MI2001A2072

(51) Int. Cl.
*B23P 23/00*   (2006.01)
*B23Q 16/00*   (2006.01)

(52) U.S. Cl. ................ 74/813 C; 74/813 R; 74/813 L; 74/826; 29/38 B

(58) Field of Classification Search ............. 74/813 L, 74/813 R, 826, 89.23, 813 C; 29/38 B; 173/19, 173/165; B23P 23/00
See application file for complete search history.

(56) References Cited

U.S. PATENT DOCUMENTS

| | | | | | |
|---|---|---|---|---|---|
| 3,126,766 | A | * | 3/1964 | Bent | 173/19 |
| 3,798,722 | A | * | 3/1974 | Lutz | 74/813 L |
| 4,080,849 | A | * | 3/1978 | Benjamin et al. | 74/813 R |
| 5,090,489 | A | * | 2/1992 | Ettori | 173/165 |
| 5,261,148 | A | * | 11/1993 | Ettori | 29/38 B |
| 5,271,134 | A | * | 12/1993 | Schips | 74/813 L |
| 6,053,075 | A | * | 4/2000 | Porta | 74/826 |
| 6,240,807 | B1 | * | 6/2001 | Hebener et al. | 74/813 R |

* cited by examiner

*Primary Examiner*—Vinh T. Luong
(74) *Attorney, Agent, or Firm*—Hedman & Costigan PC; James V. Costigan

(57) ABSTRACT

An improved mechanical-hydraulic device for controlling the locking and unlocking movements of a rotary disk—ring gear system comprises a mechanical screw and screw-nut assembly for driving the disk between a locking position, and an unlocking position, and a cooperating hydraulic assembly for controlling the engagement force of the ring gears and accordingly the locking force of the rotary disk to perform high speed and safe locking and unlocking movements of the rotary disk.

2 Claims, 4 Drawing Sheets

MECHANICAL-HYDRAULIC CONTROL DEVICE FOR CONTROLLING THE LOCKING AND UNLOCKING MOVEMENTS OF ROTARY DISK IN A ROTARY DISC TABLE WORKPIECE PROCESSING APPARATUS

BACKGROUND OF THE INVENTION

The present invention relates to an improved device for controlling the locking and unlocking movements of a rotary disk, in a rotary table workpiece processing apparatus.

The invention also relates to an apparatus or machine including such an improved device.

The field of the invention is that of the machines including devices for locking and unlocking a rotary disk such as, for example, the rotary table of a transfer machine, a rotary-table conveyor, a revolver turret and the like in which, after the rotation, the locking of the rotary disk is performed by means of a ring gear coupling (for example of the HIRT type).

Are already known in the prior art machines of the above mentioned type, in which the control of the locking and unlocking movements of the rotary disk is performed by a ball recirculating screw and nut assembly which, on a side, operates on the rotary disk and, on the other side, is rotatively driven by a specifically designed motor-reducing unit.

Thus, as the screw is rotatively operated, the rotary disk is axially driven, with mutual approaching and withdrawing movements between corresponding ring gears, to provide, respectively, the locked and unlocked condition of said rotary disk.

In prior constructions of the above disclosed type, the axial force for mutually engaging the ring gears, correspondingly to the rotary disk locking operation, is fully or substantially fully provided by the ball recirculating screw and nut assembly.

Moreover, as the rotary disk has a vertical axis, to the preceding stresses, the weight of the rotary disk is also added, which, consequently, further stresses the mentioned screw and nut driving assembly.

As a direct consequence of the above disclosed drawbacks, in prior machines of the above mentioned type, the locking and unlocking speed of the rotary disk decreases with an increase of the rotary disk mass itself.

Furthermore, since the engagement force between the ring gears is fixed and determined by the driving assembly operating the screw and screw nut assembly, this effort may be insufficient as the masses to be driven are comparatively large and, anyhow, in machining operations requiring a maximum locking force by the rotary disk.

SUMMARY OF THE INVENTION

Accordingly, the main object of the present invention is to provide an improved mechanical-hydraulic device for locking and unlocking a rotary disk, controlled by a screw-nut screw assembly and a ring gear system, designed for providing high speed and properly controlled locking and unlocking movements of said rotary disk.

Another object of the present invention is to provide a device of the above-mentioned type which is very safe and reliable in operation.

Yet another object of the present invention is to provide such an improved device allowing to properly control and graduate the mutual engagement force of the ring gears, depending on the masses to be driven and the required locking loads.

Yet another object of the present invention is to provide such an improved device which, as the rotary disk has a vertical axis, is adapted to also support the weight of the rotary disk, thereby releasing the screw and screw nut assembly from the force or effort due to the weight of the rotary disk itself.

According to one aspect of the present invention the above mentioned objects, as well as yet other objects, which will become more apparent hereinafter, are achieved by a device and apparatus according to the invention.

Further preferred embodiments of the present invention are defined in the dependent claims.

With respect to prior like devices, the inventive device provides the advantage that it allows to drive with a very high speed the rotary disk for performing its locking and unlocking movements, in addition to properly controlling the engagement force of the ring gears, depending on the driven masses and the machining parameters required by the specific machining operation to be carried out.

BRIEF DESCRIPTION OF THE DRAWINGS

The above mentioned as well as yet other objects, characteristics and advantages of the present invention will become more apparent hereinafter from the following detailed disclosure of a preferred embodiment of the device and machine or apparatus according to the present invention and with reference to the accompanying drawings, given only by way of an indicative, but not limitative, example, and in which.

DESCRIPTION OF THE PREFERRED EMBODIMENT

Figure 1:
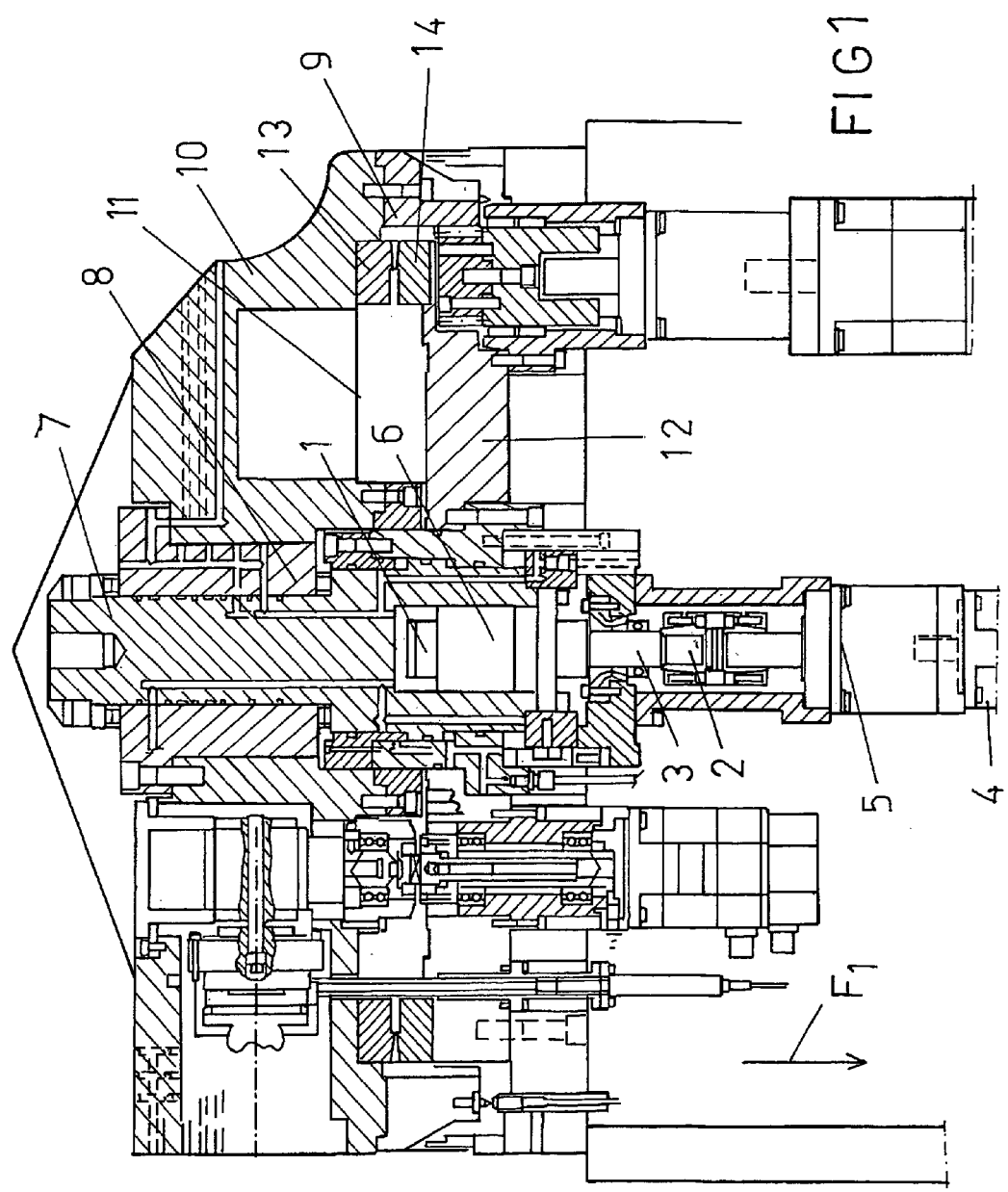
FIG. 1 is an axial cross-sectional view illustrating the improved device according to the present invention in a locking condition of the rotary disk.

The inventive device shown in FIG. 1 for controlling a rotary disk in a rotary-table workpiece processing apparatus comprises a ball recirculating screw 1, one end 3 of which is coupled to a rotary coupling 2, which is in turn driven by a motor 4-reducing unit 5 assembly or geared motor unit.

As shown, the ball recirculating screw 1 is rotatably engaged inside a fixed screw-nut 6, in turn rigid with a driving shaft 7.

The driving shaft 7 is coupled, through a bearing 8, to the rotary disk or table 10, including a main gear wheel 9, driven by a suitably designed motor-reducing assembly.

On the surface 11 of the disk 10 facing the machine bed 12, is provided a ring gear 13 (for example of a HIRT type), which can be rotatably driven together with the disk 10.

On the surface of the machine bed 12 facing the disk 10, is provided a ring gear 14, corresponding to the mentioned ring gear 13, and meshing therewith.

Thus, as the screw 1 is rotatively driven in the screw-nut 6, the shaft 7 will be axially displaced, together with the disk 10, between the mutual engagement and disengagement positions of the ring gears 13 and 14, correspondingly respectively to the locking and unlocking positions of the rotary disk 10.

Figure 2:
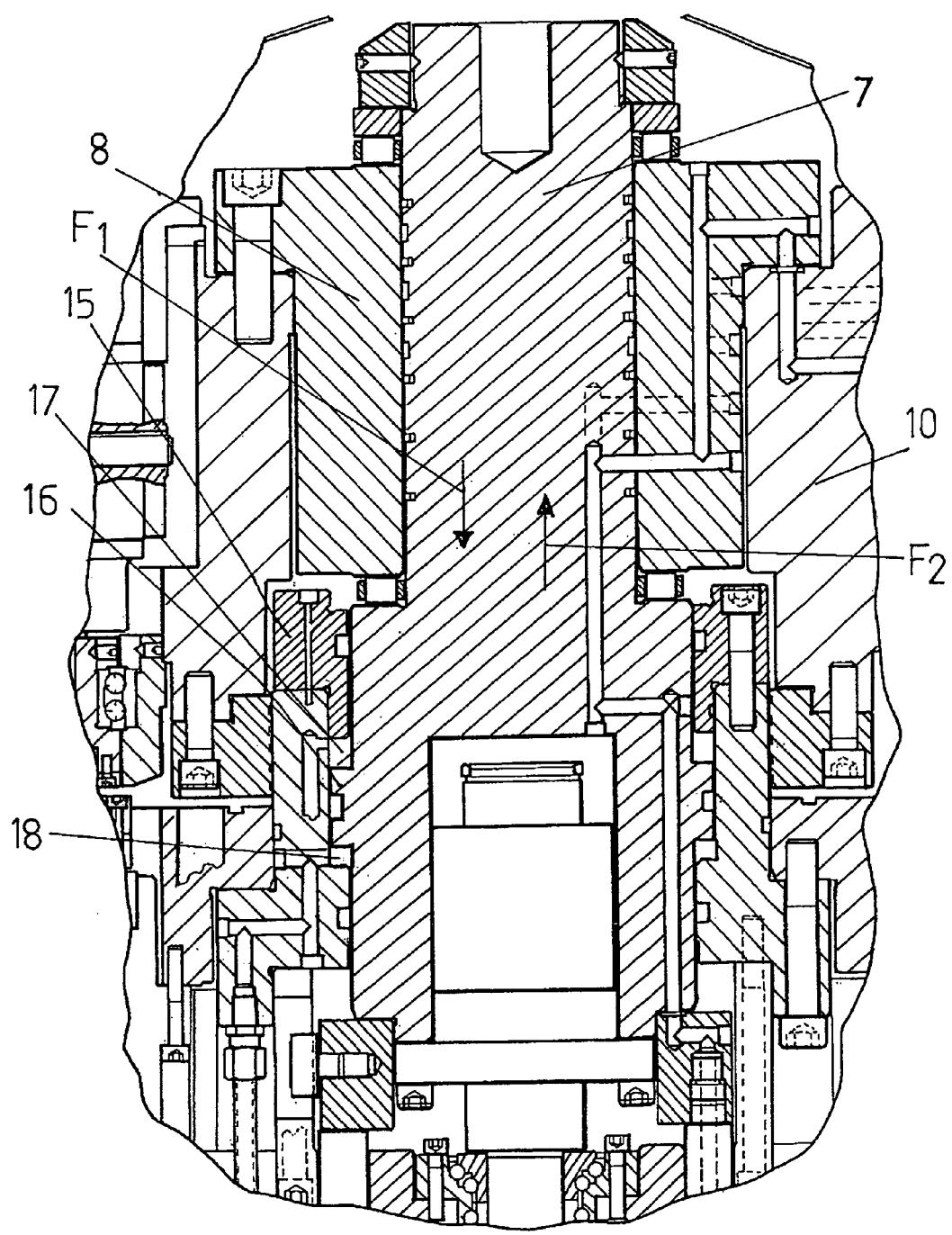
FIG. 2 illustrates a detail, on an enlarged scale, of an assembly including the cylinder and piston of the device shown in FIG. 1.
Figure 3:
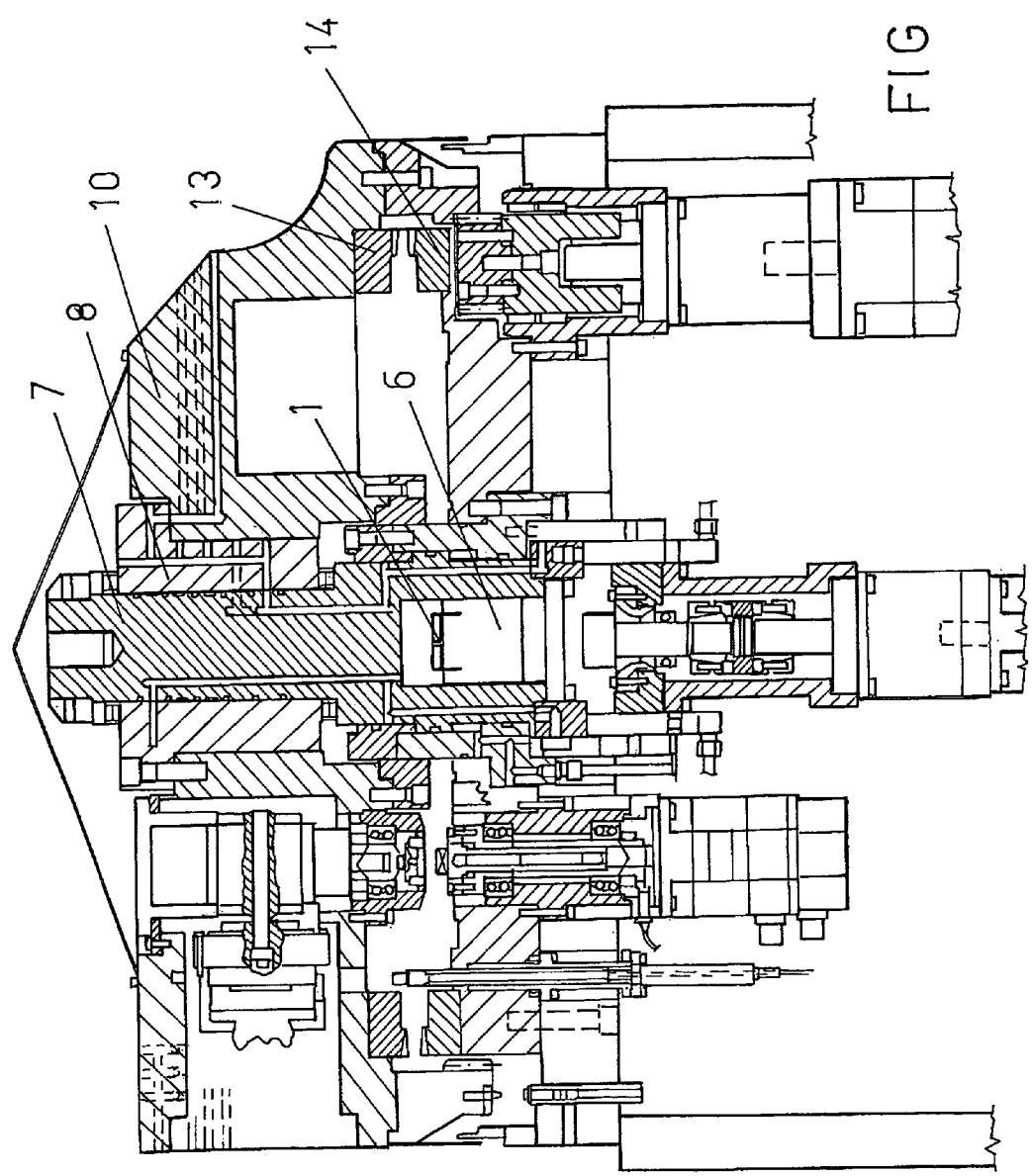
FIG. 3 illustrates the device shown in FIG. 1 in an unlocking condition of the rotary disk.

To the above-mentioned movements of the shaft 7 and disk 10, provided by the disclosed mechanical screw and screw-nut assembly, also contributes the cylinder and piston assembly better shown in FIG. 2 and constituting, as it should be apparent to one skilled in the art, a hydraulic assembly constituting an integrated part of the inventive mechanical and hydraulic control device.

More specifically, the cylinder comprises a cylinder chamber 15, formed inside the machine bed 12.

In said cylinder chamber 15 is axially slidably received the piston, comprising an enlarged portion 16, directly formed on the body of the shaft 7.

Figure 4:
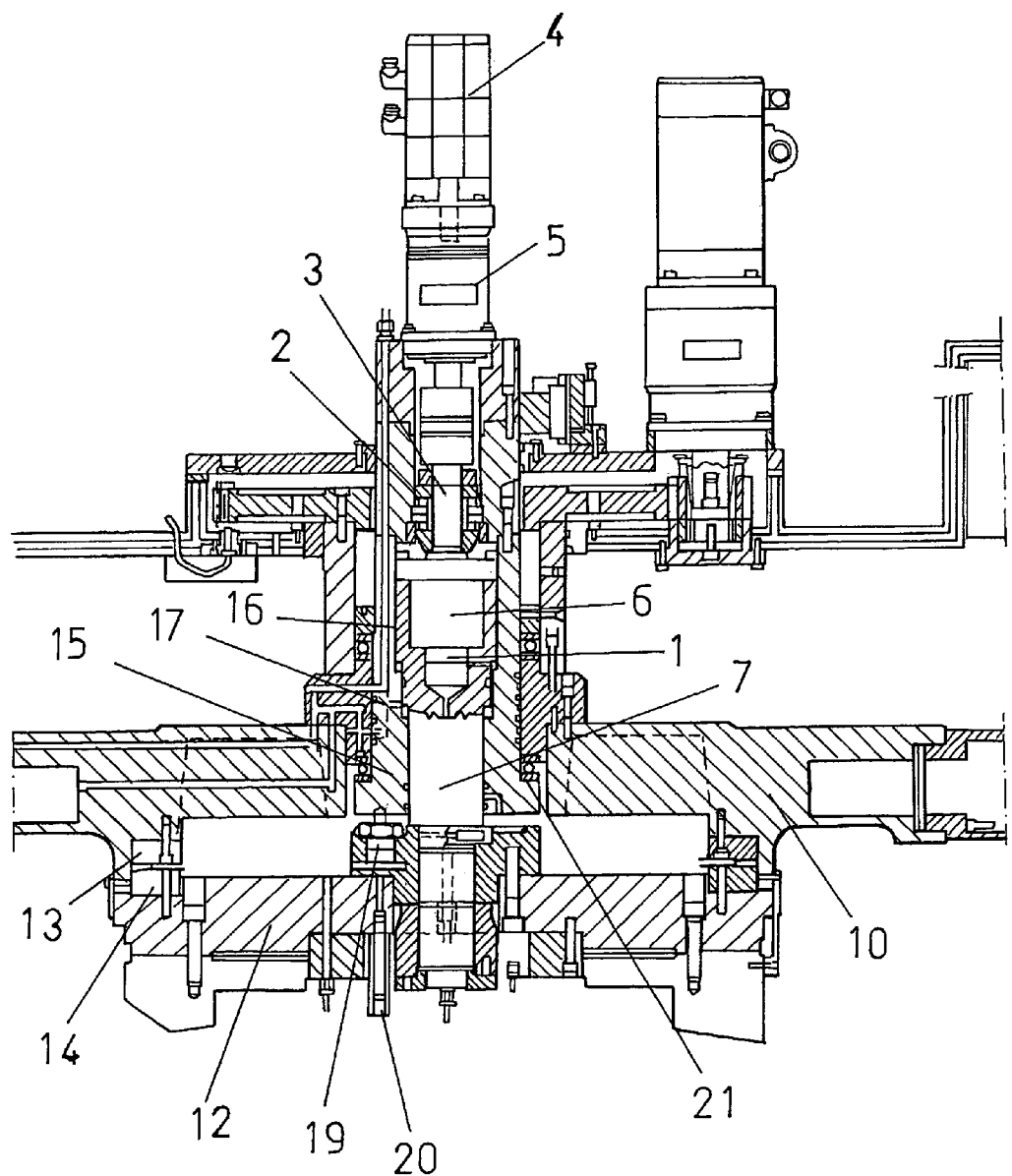
FIG. 4 illustrates a modified embodiment of the unlocking means for unlocking the rotary disk in the device according to the present invention.

In a modified embodiment, shown in FIG. 4 of the inventive device, the unlocking of the disk 10, corresponding to the movement of the shaft 7 in the direction of the arrow F2 is performed by unlocking micro-cylinders 19, driven by an unlocking hydraulic circuit 20, arranged on the machine bed 12.

Said unlocking micro-cylinders 19 are designed for axially operating against that portion of the cylinder 15 facing the machine bed 12, axially slidably mounted on the piston 16, thereby causing the ring gears 13 and 14 to be driven away from one another.

In this modified embodiment which specifically relates to the rotary disk unlocking means, the rotary disk 10 is mounted, through a bearing 21, on the cylinder 15.

As a further possible modified embodiment of the rotary disk unlocking means, the unlocking circuits 18 and 20 could be omitted, and the screw 1 and screw-nut 6 assembly could be also used to move away from one another and disengage the ring gears 13 and 14.

Such an embodiment can be advantageously applied in rotary disks or tables 10 having a horizontal axis or a small size, the movements of which are affected in a less degree by their weight force.

The device according to the present invention can be assembled on rotary table machines, in particular transfer tool machines having either a vertical or a horizontal axis.

The invention claimed is:

1. A mechanical-hydraulic control device for mechanically and hydraulically controlling locking and unlocking movements of an axially and rotatively driven rotary disk forming a table of a rotary-table workpiece processing transfer tool machine having a machine bed, said control device including a mechanical control assembly and a hydraulic control assembly, said mechanical control assembly including a ball recirculating screw coupled to a rotary coupling driven by a motor-reducing unit assembly, said ball recirculating screw being rotatively engaged in a fixed screw nut rigid with an axially movable driving shaft on which said rotary disk is rotatively mounted, said rotary disk having a rotary disk surface facing said machine bed and supporting a first ring gear to be also rotatively driven, said machine bed having a machine bed surface facing said rotary disk and having a second ring gear adapted to engage with and disengage from said first ring gear as said ball recirculating screw is rotatively driven in said fixed screw nut so as to axially move said driving shaft and said rotary disk, thereby respectively locking and unlocking said rotary disk, wherein said hydraulic control assembly of said control device comprises a piston-cylinder assembly including a piston coupled to said rotary disk and a cylinder defined by a chamber formed in said machine bed, said piston comprising an enlarged portion of said shaft which is axially slidably engaged in said cylinder, said axially slidable piston being hydraulically operated to perform a bidirectional slidable movement in said cylinder as to lock and unlock said rotary disk in cooperation with said ball recirculating screw.

2. A device according to claim 1, wherein said axially slidable piston is driven by two independent hydraulic circuits, respectively a locking hydraulic circuit and an unlocking hydraulic circuit for locking and unlocking said rotary disk, said locking hydraulic circuit cooperating with said ball recirculating screw to lock said rotary disk while said unlocking hydraulic circuit is deactuated, and said unlocking hydraulic circuit cooperating with said ball recirculating screw to unlock said rotary disk, while said locking hydraulic circuit is deactuated.

* * * * *